United States Patent
Keskikangas et al.

(10) Patent No.: US 12,277,219 B2
(45) Date of Patent: Apr. 15, 2025

(54) SYSTEM, DEVICE AND METHOD FOR ENABLING IDENTIFICATION WHEN A SECURITY SENSITIVE FUNCTION HAS BEEN PREVIOUSLY ENABLED

(71) Applicant: Axis AB, Lund (SE)

(72) Inventors: Axel Keskikangas, Lund (SE); Martin Nilsson, Lund (SE)

(73) Assignee: AXIS AB, Lund (SE)

( * ) Notice: Subject to any disclaimer, the term of this patent is extended or adjusted under 35 U.S.C. 154(b) by 266 days.

(21) Appl. No.: 17/968,329

(22) Filed: Oct. 18, 2022

(65) Prior Publication Data

US 2023/0134104 A1 May 4, 2023

(30) Foreign Application Priority Data

Nov. 2, 2021 (EP) .................................. 21205972

(51) Int. Cl.
*G06F 21/55* (2013.01)
*G06F 21/60* (2013.01)

(52) U.S. Cl.
CPC .......... *G06F 21/554* (2013.01); *G06F 21/604* (2013.01); *G06F 2221/034* (2013.01)

(58) Field of Classification Search
CPC . G06F 21/554; G06F 21/604; G06F 2221/034
See application file for complete search history.

(56) References Cited

U.S. PATENT DOCUMENTS

| 10,521,618 B1 | 12/2019 | Zhang et al. |
| 2019/0163913 A1 | 5/2019 | Sun |
| 2020/0092103 A1 | 3/2020 | Zavertnik et al. |
| 2020/0293694 A1* | 9/2020 | Gonzalez Mendez ...................... G06F 21/575 |
| 2023/0177217 A1* | 6/2023 | Hughes .................. A61B 8/565 600/459 |

FOREIGN PATENT DOCUMENTS

WO 2021/015707 A1 1/2021

OTHER PUBLICATIONS

Extended European Search Report dated Mar. 29, 2022 for European Patent Application No. 21205972.9.

* cited by examiner

*Primary Examiner* — Normin Abedin
(74) *Attorney, Agent, or Firm* — Volpe Koenig

(57) ABSTRACT

Upon detecting an event indicating enabling of security sensitive functionality of an electronic device, a value previously unknown to the electronic device is obtained and the current content of the data storage to a new current content of the data storage is updated according to an updating function based on the current content of the data storage and the value, wherein, without privileged access, the current content of the data storage can only be updated using the updating function. The value is further obtained in a management module and an expected new current content of the data storage is determined in the management module according to the updating function based on known original content of the data storage and the value. Upon determining that the new current content of the data storage differs from the expected new current content of the data storage, a validation module generates a security notification.

13 Claims, 5 Drawing Sheets

SYSTEM, DEVICE AND METHOD FOR ENABLING IDENTIFICATION WHEN A SECURITY SENSITIVE FUNCTION HAS BEEN PREVIOUSLY ENABLED

FIELD OF INVENTION

The present disclosure relates to identification of possible tampering with an electronic device to be used for a first time, and specifically to identification when a security sensitive function has been previously enabled in the electronic device.

TECHNICAL BACKGROUND

When an electronic device has been manufactured, it is important to ensure the integrity of the electronic device up until the camera is delivered to an end user such that the end user can be sure that the electronic device has not been tampered with. It may be difficult for a manufacturer to ensure this since the manufacturer may not have complete control of the supply chain from manufacturing to final delivery to the end user. Hence, it may be difficult to ensure that no outside party had access to the device and tampered with it before the electronic device reaches the end user. This is particularly important for networked electronic devices, such as a networked camera, since tampering with such electronic devices may result in enabling access to the electronic device by an outside party after the electronic device has been connected to a network, such as to internet, or that the integrity and/or security of the electronic device is otherwise compromised.

SUMMARY

Set forth herein are methods and systems for notifying when security sensitive functionality of an electronic device has been previously enabled and a method and an electronic device for enabling notifying when security sensitive functionality of an electronic device has been previously enabled which overcome or mitigate issues in known methods and systems.

According to a first aspect, a method is provided for notifying when security sensitive functionality of an electronic device has been previously enabled, wherein the electronic device comprises a data storage having a current content. In the electronic device, an event indicating enabling of security sensitive functionality of the electronic device is detected. Upon detecting the event indicating enabling of security sensitive functionality of the electronic device, a value previously unknown to the electronic device is obtained in the electronic device and the current content of the data storage is updated to a new current content of the data storage according to an updating function based on the current content of the data storage and the value, wherein, without privileged access, the current content of the data storage can only be updated using the updating function. The new current content of the data storage is then forwarded from the electronic device to a validation module. The value is further obtained in a management module, an expected new current content of the data storage is determined in the management module according to the updating function based on a known original content of the data storage and the value. The management module then forwards the expected new current content of the data storage to the validation module. In the validation module the new current content of the data storage is compared with the expected new current content of the data storage. Upon determining that the new current content of the data storage differs from the expected new current content of the data storage, the validation module generates a security notification.

By an event indicating enabling of security sensitive functionality of an electronic device is meant any event from which it can be deduced that security sensitive functionality of an electronic device has been enabled. Such security sensitive functionality may be any type of functionality that may compromise the security of the electronic device when enabled by an outside party.

By a new current content is meant the content of the data storage after updating by means of the updating function. The updating function and obtained value are such that the new current content will virtually always be different from the current content. By virtually always is meant that the probability for the new current content being the same as the current content after updating is so small that it has no practical effect. In the present disclosure, when it is indicated that the new current content after updating according to the updating function will be different from the current content, it is intended to cover also updating functions for which the new current content can be the same as the current content but where this is so improbable that it has no practical effect.

By known original content is meant content of the data storage at a time where it can be ensured that enabling of security sensitive functionality of the electronic device has not occurred.

By updating the current content of the data storage according to the updating function based on the current content of the data storage and the value upon detecting the event indicating enabling of security sensitive functionality of the electronic device, no event indicating enabling of security sensitive functionality of the electronic device can be detected without updating of the current content of the data storage according to the updating function. Hence, as soon as an event indicating enabling of security sensitive functionality of the electronic device is detected for the first time, the current content of the data storage will be different from the original content. Furthermore since, without privileged access, the current content of the data storage can only be updated using the updating function, and since the data storage has the known original content, the current content of the data storage after updating cannot be updated to be the original content again without privileged access to the data storage. Consequently, it can be determined from the new current content of the data storage (i.e., as updated) whether the detecting of the event indicating enabling of security sensitive functionality is the first time such an event is detected or if security sensitive functionality of the electronic device has been previously enabled. Specifically, since the expected new current content is determined according to the updating function based on the known original content and the value, the new current content will only be the same as the expected new current content if the current content of the data storage was the same as the known original content. This will not be true if an event indicating enabling of security sensitive functionality of the electronic device has been previously detected in the electronic device.

Updating the current content of the data storage in the electronic device to a new current content of the data storage may comprise concatenating the value and the current content of the data storage, and hashing, by means of a known hashing function, the concatenation of the value and the current content of the data storage. The current content of the data storage is then updated such that the hashed concatenation of the value and the current content of the data storage is the new current content of the data storage. On condition that the known original content of the data storage 'empty', determining, in the management module, an expected new current content of the data storage may then comprise hashing, by means of the known hashing function, the value, and determining the expected new current content of the data storage to be the hashed value. Otherwise determining, in the management module, an expected new current content of the data storage may then comprise obtaining the known original content of the data storage, hashing, by means of the known hashing function, a concatenation of the value and the known original content of the data storage, and determining the expected new current content of the data storage to be the hashed concatenation of the value and the known original content of the data storage.

By 'empty' is meant that updating the data storage using the function will result in the new current content being the same as if the function was performed on the value only. Empty may for example mean that the current content of the data storage is " " (the empty string), NULL, such as one or more "0". Empty may also mean that the current content of the data storage is marked as non-initialized and the function could then be configured such that the new current content will be the same as if the function was performed on the value only.

By using the updating function including concatenation of the value and the current content of the data storing, hashing of the concatenation and updating the data storage such that the new current content is the hashed concatenation, the new current content of the data storage will be different from the current content before updating.

Obtaining the value in the management module may comprise determining the value in the management module. The value may then be forwarded from the management module to the electronic device such that obtaining the value in the electronic device comprises receiving the value from the management module.

By determining the value in the management module, the determined value can be controlled in the management module and hence, it can be ensured in the management module that the value is not previously known in the electronic device.

The event indicating enabling of security sensitive functionality of the electronic device may consists of one of setting of a root password, setting of an administrator password, etc.

According to a second aspect, a system for notifying when security sensitive functionality of an electronic device has been previously enabled is provided. The system comprises an electronic device, a management module, and a validation module. The electronic device comprises a data storage having a current content, and device circuitry. The device circuitry is configured to execute a detection function configured to detect an event indicating enabling of security sensitive functionality of the electronic device, a device value obtaining function configured to, upon detection by the detection function of an event indicating enabling of security sensitive functionality of the electronic device, obtain a value previously unknown to the electronic device, an updating function configured to, upon detection by the detection function of an event indicating enabling of security sensitive functionality of the electronic device, update the current content of the data storage to a new current content of the data storage according to an updating function based on the current content of the data storage and the value, wherein, without privileged access, the current content of the data storage can only be updated using the updating function, and a device forwarding function configured to forward the new current content of the data storage to the validation module. The management module comprises management module circuitry configured to execute a management module value obtaining function configured to obtain the value, an expected new current content determining function configured to determine an expected new current content of the data storage according to the updating function based on a known original content of the data storage and the value, and a management module forwarding function configured to forward the expected new current content of the data storage to the validation module. The validation module comprises validation module circuitry configured to execute a comparing function configured to compare the new current content of the data storage with the expected new current content of the data storage, and a notification generating function configured to, upon determining that the new current content of the data storage received from the electronic device differs from the expected new current content of the data storage, generate a security notification.

The above-mentioned features of the method according to the first aspect, when applicable, apply to this second aspect as well. In order to avoid undue repetition, reference is made to the above.

According to a third aspect, a non-transitory computer readable storage medium is provided having stored thereon instructions for implementing the method according to the first aspect, when executed on a system according to the second aspect.

The above-mentioned features of the method according to the first aspect, when applicable, apply to this third aspect as well. In order to avoid undue repetition, reference is made to the above.

According to a fourth aspect, a method in an electronic device is provided for enabling notifying when security sensitive functionality of the electronic device has been previously enabled, wherein the electronic device comprises a data storage having a current content. An event indicating enabling of security sensitive functionality of the electronic device is detected. Upon detecting the event indicating enabling of security sensitive functionality of the electronic device a value previously unknown to the electronic device is obtained, and the current content of the data storage is updated to a new current content of the data storage according to an updating function based on the current content of the data storage and the value, wherein, without privileged access, the current content of the data storage can only be updated using the updating function.

By updating the current content of the data storage according to the updating function based on the current content of the data storage and the value upon detecting the event indicating enabling of security sensitive functionality of the electronic device, no event indicating enabling of security sensitive functionality of the electronic device can be detected without updating of the current content of the data storage according to the updating function. Hence, as soon as an event indicating enabling of security sensitive functionality of the electronic device is detected for the first time, the current content of the data storage will be different from the original content. Furthermore since, without privileged access, the current content of the data storage can only be updated using the updating function, the current content of the data storage after updating cannot be updated to be the original content again without privileged access to the data storage. Consequently, it can be determined from the new current content of the data storage (i.e., as updated) whether the detecting of the event indicating enabling of security sensitive functionality is the first time such an event is detected or if security sensitive functionality of the electronic device has been previously enabled. Specifically, based on knowledge of the updating function and the original content of the data storage, it can be determined if the current content of the data storage was equal to the known original content. This will not be the case if an event indicating enabling of security sensitive functionality of the electronic device has been previously detected in the electronic device. Alternatively, it can be determined from the current content of the data storage whether the detecting of the event indicating enabling of security sensitive functionality is the first time such an event is detected or if security sensitive functionality of the electronic device has been previously enabled. Specifically, only if the current content is equal to the known original content, it can be determined that an event indicating enabling of security sensitive functionality of the electronic device has not been previously detected in the electronic device.

The above-mentioned features of the method according to the first aspect, when applicable, apply to this fourth aspect as well. In order to avoid undue repetition, reference is made to the above.

According to a fifth aspect, an electronic device comprising a data storage having a current content and device circuitry is provided. The device circuitry is configured to execute a detection function configured to detect an event indicating enabling of security sensitive functionality of the electronic device, a value obtaining function configured to, upon detection of the event indicating enabling of security sensitive functionality of the electronic device, obtain a value previously unknown to the electronic device, and an updating function configured to, upon detection of the event indicating enabling of security sensitive functionality of the electronic device, update the current content of the data storage to a new current content of the data storage according to an updating function based on the current content of the data storage and the value, wherein, without privileged access, the current content of the data storage can only be updated using the updating function.

The above-mentioned features of the method according to the first aspect, when applicable, apply to this fifth aspect as well. In order to avoid undue repetition, reference is made to the above.

According to a sixth aspect, a non-transitory computer readable storage medium is provided having stored thereon instructions for implementing the method according to the fourth aspect, when executed on an electronic device according to the fifth aspect.

The above-mentioned features of the method according to the first aspect, when applicable, apply to this sixth aspect as well. In order to avoid undue repetition, reference is made to the above.

According to a seventh aspect, a method is provided for notifying when security sensitive functionality of an electronic device has been previously enabled, wherein the electronic device comprises a data storage having a current content. An event is detected in the electronic device indicating enabling of security sensitive functionality of the electronic device. Upon detecting the event indicating enabling of security sensitive functionality of the electronic device the current content of the data storage is forwarded to a validation module, a value previously unknown to the electronic device is obtained and the current content of the data storage is updated to a new current content of the data storage according to an updating function based on the current content of the data storage and the value, wherein, without privileged access, the current content of the data storage can only be updated using the updating function. Upon determining in the validation module that the current content of the data storage received from the electronic device differs from an original content of the data storage, generating a security notification.

By updating the current content of the data storage according to the updating function based on the current content of the data storage and the value upon detecting the event indicating enabling of security sensitive functionality of the electronic device, no event indicating enabling of security sensitive functionality of the electronic device can be detected without updating of the current content of the data storage according to the updating function. Hence, as soon as an event indicating enabling of security sensitive functionality of the electronic device is detected for the first time, the current content of the data storage will be different from the original content. Furthermore since, without privileged access, the current content of the data storage can only be updated using the updating function, the current content of the data storage after updating cannot be updated to be the original content again without privileged access to the data storage. Consequently, it can be determined from the current content of the data storage whether the detecting of the event indicating enabling of security sensitive functionality is the first time such an event is detected or if security sensitive functionality of the electronic device has been previously enabled. Specifically, only if the current content is equal to the known original content, it can be determined that an event indicating enabling of security sensitive functionality of the electronic device has not been previously detected in the electronic device.

The above-mentioned features of the method according to the first aspect, when applicable, apply to this seventh aspect as well. In order to avoid undue repetition, reference is made to the above.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the systems described or acts of the methods described as such device and method may vary. It is also to be understood that the terminology used herein is for purpose of describing particular embodiments only and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF DRAWINGS

The above and other aspects of the present disclosure will now be described in more detail, with reference to appended figures. The figures should not be considered limiting but are instead used for explaining and understanding. Like reference numerals refer to like elements throughout.

DETAILED DESCRIPTION

Figure 1:
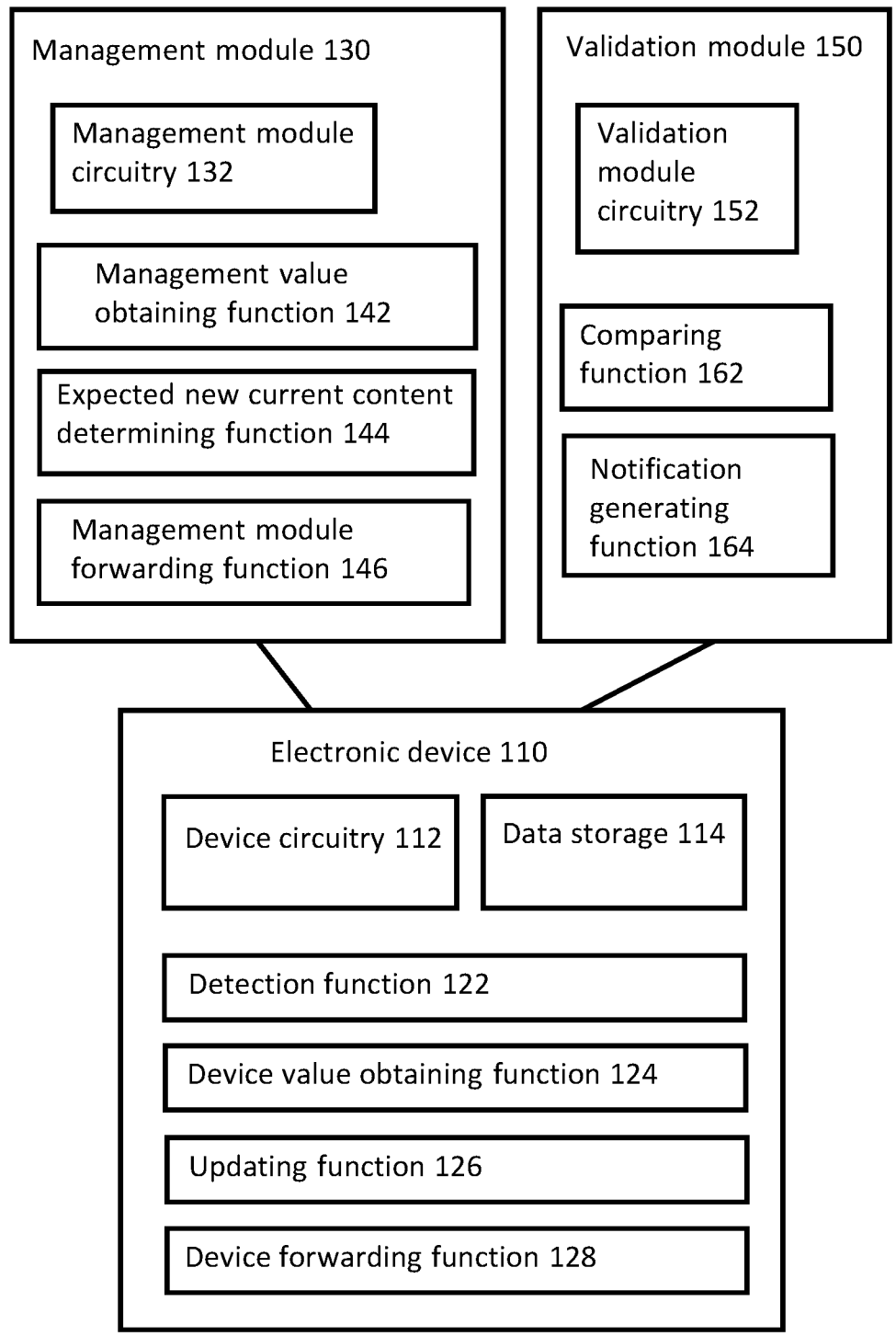
FIG. 1 is a schematic block diagram of embodiments of a system for notifying when security sensitive functionality of an electronic device has been previously enabled.

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Rather, these embodiments are provided for thoroughness and completeness, and to convey the scope of the disclosure to the skilled person.

Dashed lines in the drawings in relation to a feature indicates that the feature is optional.

FIG. 1 is a schematic block diagram of embodiments of a system 100 for notifying when security sensitive functionality of an electronic device 110 has been previously enabled. The system comprises the electronic device 110, a management module 130, and a validation module 150. The electronic device 110 may for example be a networked electronic device 110, such as a networked camera, which should be connected to a network, such as the internet. The management module 130 and the validation module 150 may be located in the same device or in different devices. For example, the management module 130 and the validation module 150 may be located in the same or different cloud-based servers or even in the electronic device 110.

The event indicating enabling of security sensitive functionality of the electronic device 110 may for example be setting of a root password, setting of an administrator password. Further events indicating enabling of security sensitive functionality are encompassed, such as enabling debug software functionality, enabling hardware debug functionality such as JTAG, scan chains, boundary scan or other DFT logic etc. Further examples include accessing onboarding tokens for networks, cloud services and similar.

The electronic device 110 comprises a data storage 114 having a current content and device circuitry 112. The device circuitry 112 is configured to carry out functions of the electronic device 110.

Specifically, the device circuitry 112 is configured to execute a detection function 122 configured to detect an event indicating enabling of security sensitive functionality of the electronic device 110.

The device circuitry 112 is further configured to execute a device value obtaining function 124 configured to, upon detection by the detection function 122 of an event indicating enabling of security sensitive functionality of the electronic device 110, obtain a value previously unknown to the electronic device 110.

The device circuitry 112 is further configured to execute an updating function 126 configured to, upon detection by the detection function 122 of an event indicating enabling of security sensitive functionality of the electronic device 110, update the current content of the data storage 114 to a new current content of the data storage 114. The updating is performed according to an updating function based on the current content of the data storage 114 and the value. Furthermore, the electronic device 110 and/or the data storage 114 should be such that, without privileged access, the current content of the data storage 114 can only be updated using the updating function.

The data storage 114 may for example be implemented by means of a permanent (or non-resettable) Platform Configuration Register (PCR) which may be located in a Trusted Platform Module (TPM) (not shown) or similar of the electronic device 110. The TPM may be a hardware TMP of a so-called firmware TPM (fTPM) which is a software implementation of the TPM functionality. Generally, the PCR may be located in a dedicated hardware block (security subsystem). The PCR may alternatively be located in other types of secure element hardware.

The updating function should be irreversible, i.e., after an update according to the updating function, it should not be feasible to perform a further update according to the updating function so that the content of the data storage is the same as before the update. Furthermore, the updating function should be collision resistant, i.e., the updating function should be such that, for a sufficiently long obtained value, the new current content should virtually always be different from the current content. By virtually always is meant that the probability for the new current content being the same as the current content after updating is so small that it has no practical effect. The obtained value should be previously unknown to the electronic device 110 and should be sufficiently long for the new current content virtually always being different from the current content when updating is according to a collision resistant updating function. For example, 16 bytes is sufficient.

The updating function 126 may be configured to update the current content of the data storage by extending it with the value. In such a case the updating function 126 will concatenate the value and the current content of the data storage 114, and hash, by means of a known hashing function, the concatenation of the value and the current content of the data storage 114. The data storage 114 is then updated such that the hashed concatenation of the value and the current content of the data storage 114 is the new current content of the data storage 114. The known hash function should be collision resistant, and may for example be SHA-2, SHA-3, BLAKE2, SM3 or GHOST. Other alternatives are encompassed, such as also including a counter in the concatenation where the counter is increased each time the data storage is updated. The order of the arguments being hashed can be:

The device circuitry 112 is further configured to execute a device forwarding function 128 configured to forward the new current content of the data storage 114 to the validation module 150.

The management module 130 comprises a management module circuitry 132 configured to carry out functions of the management module 130.

Specifically, the management module circuitry 132 is configured to execute a management module value obtaining function 142 configured to obtain the value. The management module value obtaining function 142 may be configured to determine the value, i.e., the value is determined in the management module 130. The value may for example be a random nonce, i.e., an arbitrary number that can be used just once in a cryptographic communication. The management module circuitry 132 may then further be configured to execute a value forwarding function (not shown) configured to forward the value to the electronic device 110. The device value obtaining function 124 is then configured to receive the value from the management module 130.

The management module circuitry 132 is further configured to execute an expected new current content determining function 144 configured to determine an expected new current content of the data storage 114 according to the updating function based on a known original content of the data storage 114 and the value.

The management module circuitry 132 may be further configured to execute a known original content obtaining function (not shown) configured to obtain a known original content of the data storage 114.

The expected new current content determining function may further be configured to hash, by means of the known hashing function, a concatenation of the value and the known original content of the data storage 114, and determine the expected new current content of the data storage 114 to be the hashed concatenation of the value and the known original content of the data storage 114.

In a scenario where the known original content of the data storage 114 is that the data storage 114 was originally empty, the expected new current content determining function 144 may be configured to hash, by means of the known hashing function, the value, and determine the expected new current content of the data storage 114 to be the hashed value. By 'empty' is meant that updating the data storage using the function will result in the new current content being the same as if the function was performed on the value only. Empty may for example mean that the current content of the data storage is " " (the empty string), or NULL, such as one or more "0". Empty may also mean that the current content of the data storage is marked as non-initialized and the function could then be configured such that the new current content will be the same as if the function was performed on the value only.

The management module circuitry 132 is further configured to execute a management module forwarding function 146 configured to forward the expected new current content of the data storage 114 to the validation module 150.

The validation module 150 comprises validation module circuitry 152 configured to execute a comparing function 162 configured to compare the new current content of the data storage 114 with the expected new current content of the data storage 114.

The validation module circuitry 152 is further configured to execute a notification generating function 164 configured to, upon determining that the new current content of the data storage 114 differs from the expected new current content of the data storage 114, generate a security notification.

The device circuitry 112, management module circuitry 132, and validation module circuitry 152 may include a respective processor (not shown), such as a central processing unit (CPU), microcontroller, or microprocessor. The processor may be configured to execute program code. The program code may for example be configured to carry out the functions of the electronic device 110, management module 130, and validation module 150, respectively.

The electronic device 110, management module 130, and validation module 150 may further comprise a respective memory (not shown). The memory may be one or more of a buffer, a flash memory, a hard drive, a removable media, a volatile memory, a non-volatile memory, a random access memory (RAM), or another suitable device. In a typical arrangement, the memory may include a non-volatile memory for long term data storage and a volatile memory that functions as system memory. The memory may exchange data with the relevant circuitry over a data bus. Accompanying control lines and an address bus between the memory and the relevant circuitry also may be present.

Functions of the electronic device 110, management module 130, and validation module 150, respectively, may be embodied in the form of executable logic routines (e.g., lines of code, software programs, etc.) that are stored on a respective non-transitory computer readable medium (e.g., a memory) and are executed by the device circuitry 112, management module circuitry 132, and validation module circuitry 152, respectively (e.g., using a processor). Furthermore, the functions of the electronic device 110, management module circuitry 132, and validation module circuitry 152, respectively, may be a stand-alone software application or form a part of a software application that carries out additional tasks related to the electronic device 110, management module 130, and validation module 150, respectively. The described functions may be considered a method that a processing unit, e.g., a processor, is configured to carry out. Also, while the described functions may be implemented in software, such functionality may as well be carried out via dedicated hardware or firmware, or some combination of hardware, firmware and/or software.

Figure 2:
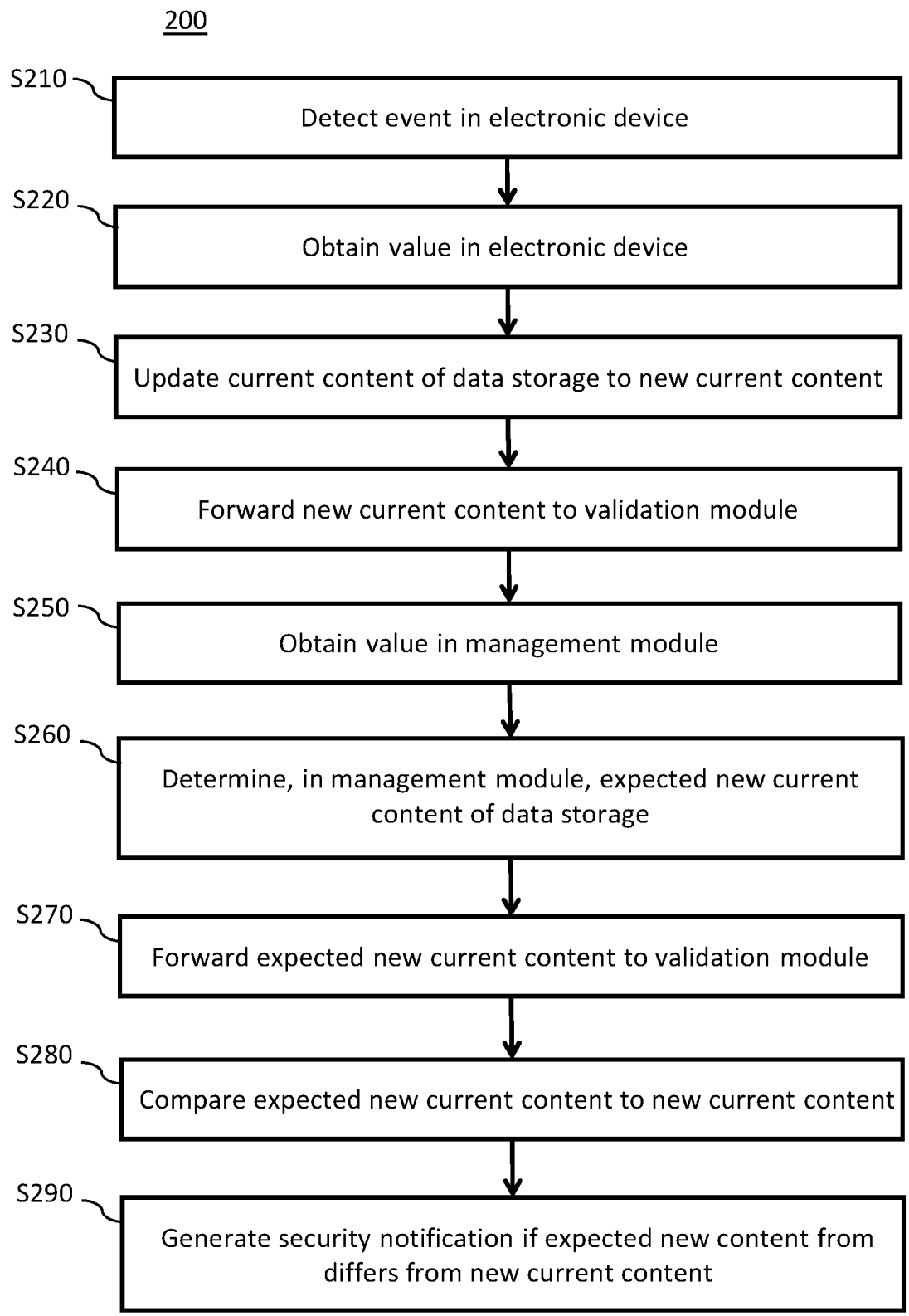
FIG. 2 is a flow chart of embodiments of a method for notifying when security sensitive functionality of an electronic device has been previously enabled.

FIG. 2 is a flow chart of embodiments of a method 200 for notifying when security sensitive functionality of an electronic device 110 has been previously enabled, wherein the electronic device 110 comprises a data storage 114 having a current content. The method may be implemented in a system 100 as described in relation to FIG. 1.

The method 200 allows for untrusted delivery of the electronic device 110 from the manufacturer to the customer. Furthermore, the method 200 is beneficial for example if the electronic device 110 allows factory default functionality resulting in erasing of all changes in non-secure writable file systems.

As an example, the method 200 may be performed in relation to an initial boot of the electronic device 110 by a user at a customer to which the electronic device 110 has been delivered. In such a scenario, the electronic device 110 may be connected to a network such as internet. An administration client, which may be implemented in a cloud-based server for example in a management module 130 as described in relation to FIG. 1, may retrieve information in relation to a Public Key Infrastructure, PKI, for the electronic device 110. When the electronic device 110 is connected to the network and boots, it may boot to a state where it waits for a root password (or an administrator password) to be set. A password management functionality within the administration client will then request the user to set the root password. The user may then set the root password. Such a setting of the root password is an event indicating that security sensitive functionality of an electronic device 110 has been enabled.

The method 200 comprises a first set of steps performed in the electronic device 110. An event indicating enabling of security sensitive functionality of the electronic device 110 is detected S210 in the electronic device 110. Upon detecting S210 the event indicating enabling of security sensitive functionality of the electronic device 110, the electronic device 110 obtains S220 a value previously unknown to the electronic device 110, updates S230 the current content of the data storage 114 to a new current content of the data storage 114, and forwards S240 the new current content of the data storage 114 to a validation module 150. The current content of the data storage 114 is updated S230 to the new current content of the data storage 114 according to an updating function based on the current content of the data storage 114 and the value. The updating S230 is required in the electronic device 110 upon detecting S210 the event. Hence, if an event indicating enabling of security sensitive functionality of the electronic device 110 is detected S210, the updating S230 will always take place. Furthermore, without privileged access, the current content of the data storage 114 can only be updated using the updating function. Hence, no other updating of the data storage 114 is possible without privileged access and the content of the data storage 114 cannot be tampered with by an unauthorized user. Privileged access may for example be authenticated by means of a private key of the electronic device 110.

Updating S230 the current content of the data storage 114 to the new current content of the data storage 114 according to the updating function based on the current content of the data storage 114 and the value may comprise concatenating the value and the current content of the data storage 114, hashing, by means of a known hashing function, the concatenation of the value and the current content of the data storage 114. The current content of the data storage 114 is then updated such that the hashed concatenation of the value and the current content of the data storage 114 is the new current content of the data storage 114. Alternative ways of updating S230 the current content of the data storage 114 to the new current content of the data storage 114 are of course possible.

The method 200 may further comprise checking in the electronic device 110 that the new current content of the data storage 114 differs from the current content of the data storage 114 before update to ensure that updating was successful. If the known original content of the data storage 114 was that the data storage 114 was empty, the check may consist of checking that the data storage 114 is not empty after update to ensure that updating was successful.

The method 200 further comprises a second set of steps performed in the management module 130. The value is obtained S250 in the management module 130, an expected new current content of the data storage 114 is determined S260 according to the updating function based on the known original content of the data storage 114 and the value, and the expected new current content of the data storage 114 is forwarded from the management module 130 to the validation module 150. It is to be noted, that obtaining S250 the value in the management module 130 need not be after the new current content is forwarded S240 from the electronic device 110. Instead, the obtaining S250 may be performed at any time earlier.

Determining, in the management module 130, the expected new current content of the data storage 114 should use the same updating function as used to update the current content to the new current content in the electronic device 110. Hence, determining the expected new current content of the data storage 114 may comprise concatenation of the value and the known original content of the data storage 114 and then hashing, by means of the known hashing function, the concatenation. The expected new current content of the data storage 114 is then determined to be the hashed concatenation of the value and the known original content of the data storage 114.

The forwarding of the new current content of the data storage 114 by the electronic device 110 to the validation module 150 may be preceded by a request from the management module 130. Furthermore, the value obtained in the electronic device 110 may be a value, such as a random nonce, determined in the management module 130. By determining the value in the management module 130, the determined value can be controlled in the management module 130 and hence, it can be ensured in the management module 130 that the value is not previously known in the electronic device 110.

The forwarding of the new current content of the data storage 114 to the validation module 150 may further include signing the new current content with a private key of the electronic device 110 by a TPM of the electronic device 110. The validation module 150 may then have previously received the public key corresponding to the private key of the electronic device 110, wherein the public key is authenticated by means of a certificate issued by a Certificate Authority (CA). Hence, the validation module 150 may validate that the new current content of the data storage 114 is in fact received from the electronic device 110 by means of the private key of the electronic device 110 used for signing.

The value which is previously unknown to the electronic device 110 may also be used to validate that the readout of the new current content of the data storage 114 received in the validation module 150 is in fact a readout of the data storage 114 made in response to the currently detected S210 event indicating enabling of security sensitive functionality of the electronic device 110. This may be done by adding the obtained value in the electronic device 110 to the new current content of the data storage 114 and having a TPM of the electronic device 110 signing the new current content of the data storage 114 plus the obtained value with the private key of the electronic device 110 and forward it to the management module 130. The obtained value previously unknown to the electronic device 110, e.g., in form of a nonce determined in the management module 130 and forwarded to the electronic device 110, may be further forwarded from the management module 130 to the validation module 150. The validation module 150 may then check by comparing the obtained value received from the management module 130 with the obtained value in the signed new current content of the data storage 114 plus the obtained value as received from the electronic device 110.

In addition to knowing the updating function used in the electronic device 110 to update the current content of the data storage 114, the known original content of the data storage 114 of the electronic device 110 has to be obtained in the management module 130 in order to determine the expected new current content. The known original content can be obtained in the management module 130 in different ways depending on how the original content is known. For example, the original content may be known in that the data storage 114 is always originally empty. The management module 130 may then assume that the data storage 114 is originally empty. The known original content of the data storage 114 may further depend on the hardware type, version etc. In such a case the management module 130 may include a table indicating the known original content for each hardware type, version etc. and then obtain an indication of the hardware type, version etc. of the electronic device 110 and identify the known original content from the table. The hardware type, version etc. may be retrieved in the management module 130 from the electronic device 110, preferably signed by the TPM of the electronic device 110 with the private key of the electronic device 110. In case the known original content of the data storage 114 is specific for each individual electronic device 110, the management module 130 may need to retrieve the known original content of the data storage 114 from a data base, possibly after retrieving information from the electronic device 110 of information indicating the individual electronic device 110.

The method 200 further comprises a third set of steps performed in the validation module 150. The new current content of the data storage 114 received in the validation module 150 from the electronic device 110 is compared S280 with the expected new current content of the data storage 114 received from the management module 130. Upon determining that the new current content of the data storage 114 differs from the expected new current content of the data storage 114, a security notification is generated S290 in the validation module 150. The security notification may then be sent from the validation module 150 to the management module 130 which can notify a user of the electronic device 110 that security sensitive functionality of the electronic device 110 has been previously enabled. In alternative the security notification may be sent from the validation module 150 directly to the user.

Figure 3:
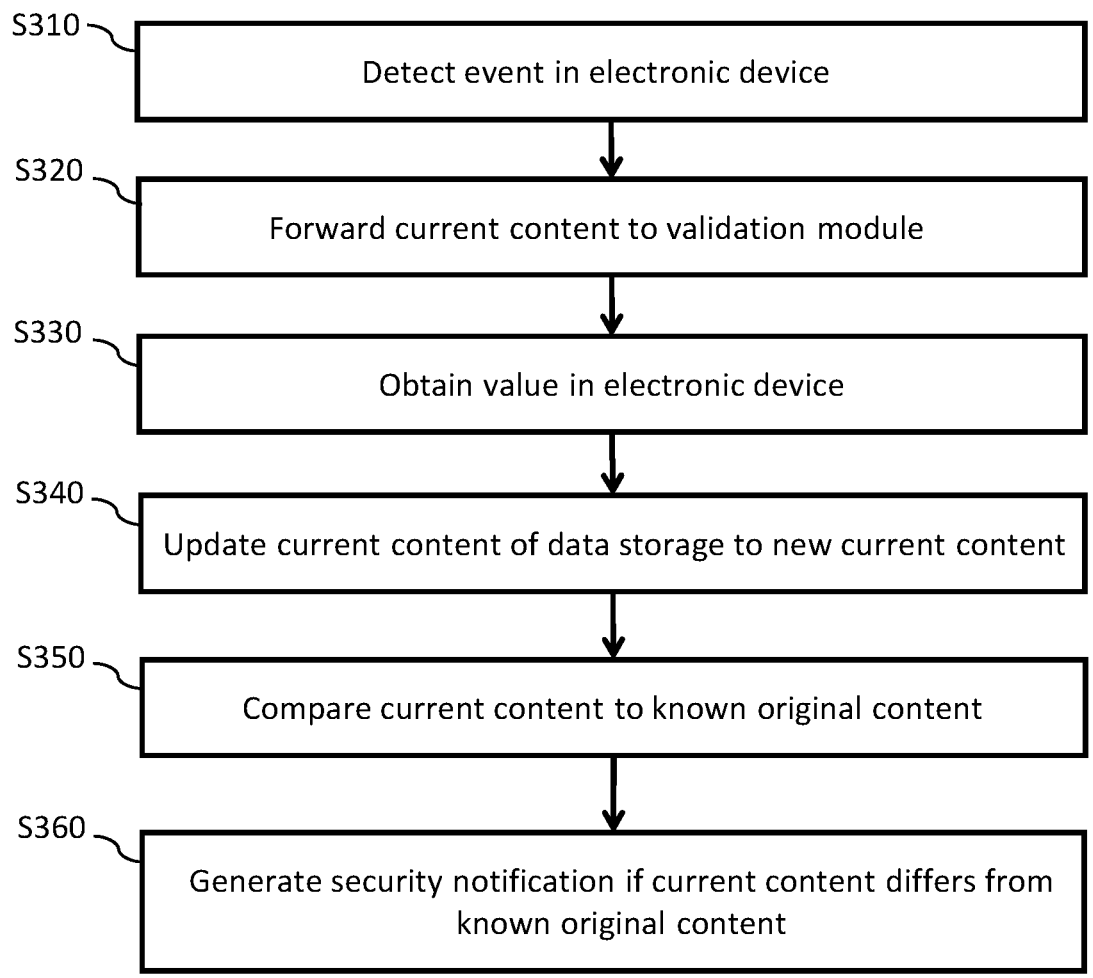
FIG. 3 is a flow chart of other embodiments of a method for notifying when security sensitive functionality of an electronic device has been previously enabled.

FIG. 3 is a flow chart of other embodiments of a method 300 for notifying when security sensitive functionality of an electronic device 110 has been previously enabled, wherein the electronic device 110 comprises a data storage 114 having a current content.

The method 300 allows for untrusted delivery of the electronic device 110 from the manufacturer to the customer. Furthermore, the method 300 is beneficial for example if the electronic device 110 allows factory default functionality erasing of all changes in non-secure writable file systems.

The method 300 makes use of a same concept as the method 200 described in relation to FIG. 2, namely that a current content of a data storage 114 is updated according to a updating function upon detecting an event indicating enabling of security sensitive functionality of an electronic device 110, wherein, without privileged access, the current content of the data storage 114 can only be updated using the updating function, and that previous enabling of security sensitive functionality of the electronic device 110 is detectable based on the current of the data storage 114. The method 300 may be implemented in a system similar to the system 100 as described in relation to FIG. 1, which may but need not include the management module 130. The method 300 may also be used in relation to the same scenario as described in relation to FIG. 2.

The method 300 comprises a first set of steps in the electronic device 110. An event indicating enabling of security sensitive functionality of the electronic device 110 is detected S310 in the electronic device 110. Upon detecting the event the current content of the data storage 114 is forwarded S320 to a validation module 150. A value previously unknown to the electronic device 110 is then obtained S330 and the current content of the data storage 114 is updated S340 to a new current content of the data storage 114 according to an updating function based on the current content of the data storage 114 and the value. The updating S340 is required in the electronic device 110 upon detecting S310 the event. Hence, if an event indicating enabling of security sensitive functionality of the electronic device 110 is detected S310, the updating S340 will always take place. Without privileged access, the current content of the data storage 114 can only be updated using the updating function.

The method 300 further comprises a second set of steps in the validation module 150. The current content of the data storage 114 as received from the electronic device 110 in step S320 is compared S350 to the known original content. The known original content can be obtained in the validation module 150 in different ways as disclosed for the method 200 in relation to FIG. 2. Upon determining that the current content of the data storage 114 received from the electronic device 110 differs from the known original content of the data storage 114, a security notification is generated S360 by the validation module 150. The security notification may then be sent from the validation module 150 to a management module 130 which can notify a user of the electronic device 110 that security sensitive functionality of the electronic device 110 has been previously enabled. In an alternative the security notification may be sent from the validation module 150 directly to the user.

A difference between the method 300 and the method 200 described in relation to FIG. 2 is that instead of forwarding S240 the new current content of the data storage 114, i.e., after updating according to the updating function, to the validation module 150 from the electronic device 110, the current content, before updating S340 according to the updating function, is forwarded S320 to the validation module. As the updating S340 according to the updating function must be done upon detecting S310, in the electronic device 110, of the event indicating enabling of security sensitive functionality of the electronic device 110, the current content of the data storage 114 will only be equal to the known original content if no such event has been previously detected. Hence, the comparison can be made in the validation module 150 between the current content of the data storage 114 as received from the electronic device 110 and the known original content of the data storage 114 in order to determine whether or not security sensitive functionality of the electronic device 110 have been previously enabled.

The steps of the method 300 may be further adapted as the corresponding steps of the method 200 described in relation to FIG. 2.

The method 300 may further comprise checking in the electronic device 110 that the new current content of the data storage 114 differs from the current content of the data storage 114 before update to ensure that updating was successful. If the known original content of the data storage 114 was that the data storage 114 was empty, the check may consist of checking that the data storage 114 is not empty after update to ensure that updating was successful.

The forwarding S320 of the current content of the data storage 114 to the validation module 150 may be preceded by a request from a management module 130. Furthermore, the value obtained in the electronic device 110 may be a value, such as a random nonce, determined in the management module 130. By determining the value in the management module 130, the determined value can be controlled in the management module 130 and hence, it can be ensured in the management module 130 that the value is not previously known in the electronic device 110.

The forwarding S320 of the current content of the data storage 114 to the validation module 150 may further include signing the current content with a private key of the electronic device 110 by a TPM of the electronic device 110. The validation module 150 may then have previously received the public key corresponding to the private key of the electronic device 110, wherein the public key is authenticated by means of a certificate issued by a Certificate Authority (CA). Hence, the validation module 150 may validate that the current content of the data storage 114 is in fact received from the electronic device 110 by means of the private key of the electronic device 110 used for signing.

The value which is previously unknown to the electronic device 110 may also be used to validate that the readout of the current content of the data storage 114 received in the validation module 150 is in fact a readout of the data storage 114 made in response to the currently detected S310 event indicating enabling of security sensitive functionality of the electronic device 110. This may be done by adding the obtained value in the electronic device 110 to the current content of the data storage 114 and having a TPM of the electronic device 110 signing the current content of the data storage 114 plus the obtained value with the private key of the electronic device 110 and forward it to the validation module 150 directly or via the management module 130. The management module 130 may then forward the obtained value to the validation module 150. The validation module 150 may then check by comparing the obtained value received from the management module 130 with the obtained value in the signed current content of the data storage 114 plus the obtained value as received from the electronic device 110.

The known original content of the data storage 114 of the electronic device 110 has to be obtained in the validation module 150 in order to compare it with the current content as received from the electronic device 110. The known original content can be obtained in the validation module 150 in different ways depending on how the original content is known. For example, the original content may be known in that the data storage 114 is always originally empty. The validation module 150 may then assume that the data storage 114 is originally empty. The known original content of the data storage 114 may further depend on the hardware type, version etc. In such a case the validation module 150 may include a table indicating the known original content for each hardware type, version etc. and then obtain an indication of the hardware type, version etc. of the electronic device 110 and identify the known original content from the table. The hardware type, version etc. may be retrieved in the management module 130 from the electronic device 110, preferably signed by the TPM of the electronic device 110 with the private key of the electronic device 110. In case the known original content of the data storage 114 is specific for each individual electronic device 110, the management module 130 may need to retrieve the known original content of the data storage 114 from a data base, possibly after retrieving information from the electronic device 110 of information indicating the individual electronic device 110.

Figure 4:
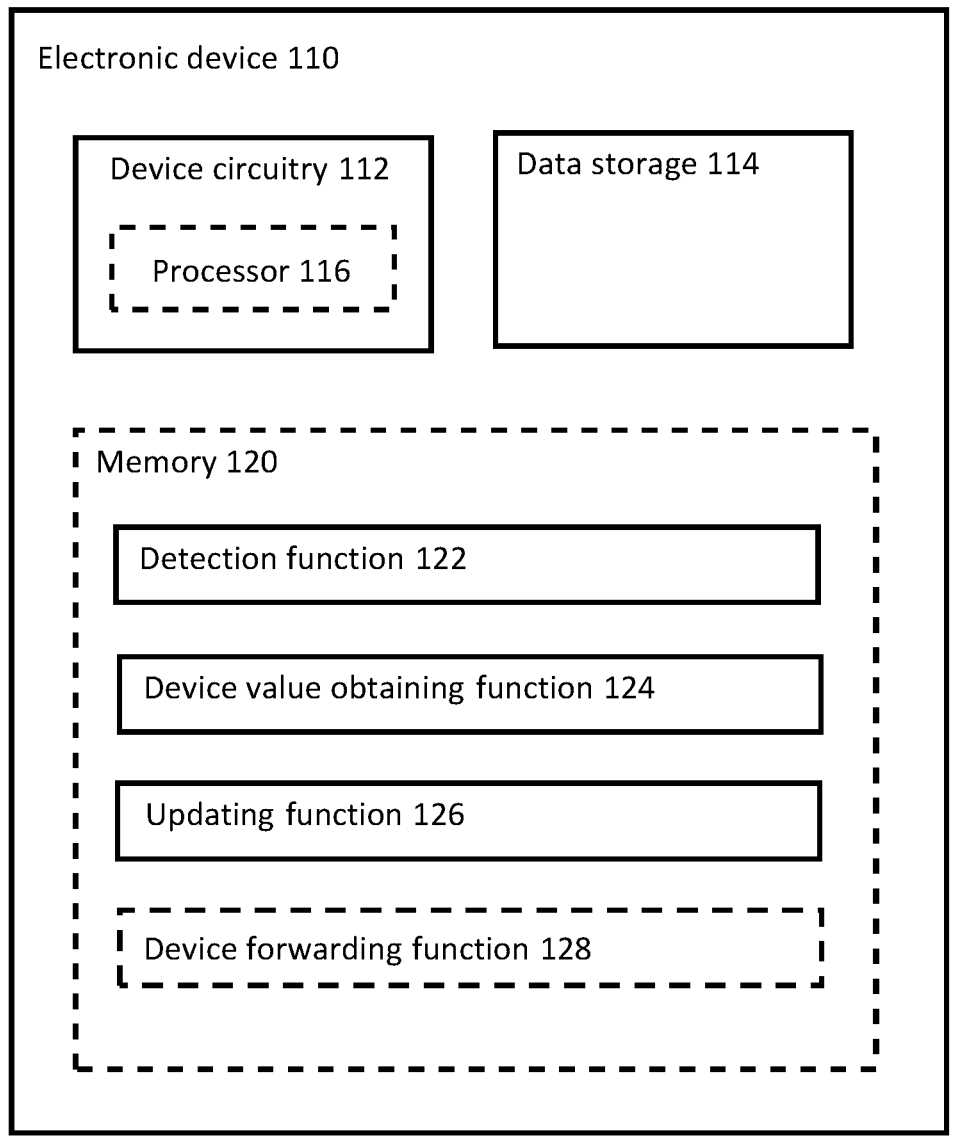
FIG. 4 is a schematic block diagram of embodiments of an electronic device for enabling notifying when security sensitive functionality of an electronic device has been previously enabled.

FIG. 4 is a schematic block diagram of embodiments of an electronic device 110 for enabling notifying when security sensitive functionality of the electronic device 110 has been previously enabled. The event indicating enabling of security sensitive functionality of the electronic device 110 may for example be setting of a root password, setting of an administrator password. Further events indicating enabling of security sensitive functionality are encompassed, such as enabling debug software functionality, enabling hardware debug functionality such as JTAG-access, Scan Chain, boundary scan or other DFT logic etc, accessing onboarding tokens to cloud services etc. The electronic device 110 comprises a data storage 114 having a current content and device circuitry 112. The device circuitry 112 is configured to carry out functions of the device 110. The device circuitry 112 is configured to carry out functions of the electronic device 110.

Specifically, the device circuitry 112 is configured to execute a detection function 122 configured to detect an event indicating enabling of security sensitive functionality of the electronic device 110.

The device circuitry 112 is further configured to execute a device value obtaining function 124 configured to, upon detection by the detection function of an event indicating enabling of security sensitive functionality of the electronic device 110, obtain a value previously unknown to the electronic device 110. The device value obtaining function 124 may be configured to receive the value, e.g., from the management module 130.

The device circuitry 112 is further configured to execute an updating function 126 configured to, upon detection by the detection function 122 of an event indicating enabling of security sensitive functionality of the electronic device 110, update the current content of the data storage 114 to a new current content of the data storage 114. The updating is performed according to an updating function based on the current content of the data storage 114 and the value. Furthermore, the electronic device 110 and/or the data storage 114 should be such that, without privileged access, the current content of the data storage 114 can only be updated using the updating function.

The data storage 114 may for example be implemented by means of a permanent (or non-resettable) Platform Configuration Register (PCR) which may be located in a Trusted Platform Module (TPM) (not shown) or similar of the electronic device 110. The TPM may be a hardware TMP of a so-called firmware TPM (fTPM) which is a software implementation of the TPM functionality. Generally, the PCR may be located in a dedicated hardware block (security subsystem). The PCR may alternatively be located in other types of secure element hardware.

The updating function 126 may be configured to concatenate the value and the current content of the data storage 114, hash, by means of a known hashing function, the concatenation of the value and the current content of the data storage, and update the data storage 114 such that the hashed concatenation of the value and the current content of the data storage 114 is the new current content of the data storage 114.

The electronic device 110 generally enables notification of that security sensitive functionality of the electronic device has been previously enabled. In order to achieve notification, the device circuitry 112 may be further configured to execute a device forwarding function 128 configured to forward the new current content of the data storage 114 to a separate module, such as the management module 130 described in relation to FIG. 1. The management module 130 may together with the validation module 150 include functions for generating a notification as described further in relation to FIG. 1.

The device circuitry 112 may include a processor 116, such as a central processing unit (CPU), microcontroller, or microprocessor. The processor 116 may be configured to execute program code. The program code may for example be configured to carry out the functions of the electronic device 110.

The electronic device 110 may further comprise a memory 120. The memory 120 may be one or more of a buffer, a flash memory, a hard drive, a removable media, a volatile memory, a non-volatile memory, a random access memory (RAM), or another suitable device. In a typical arrangement, the memory 120 may include a non-volatile memory for long term data storage and a volatile memory that functions as system memory for the device circuitry 112. The memory 120 may exchange data with the device circuitry 112 over a data bus. Accompanying control lines and an address bus between the memory 120 and the circuitry 112 also may be present.

Functions of the electronic device 110 may be embodied in the form of executable logic routines (e.g., lines of code, software programs, etc.) that are stored on a non-transitory computer readable medium (e.g., the memory 120) of the device 110 and are executed by the device circuitry 112 (e.g., using the processor 116). Furthermore, the functions of the electronic device 110 may be a stand-alone software application or form a part of a software application that carries out additional tasks related to the electronic device 110. The described functions may be considered a method that a processing unit, e.g., the processor 116 of the device circuitry 112 is configured to carry out. Also, while the described functions may be implemented in software, such functionality may as well be carried out via dedicated hardware or firmware, or some combination of hardware, firmware and/or software.

The functions of the electronic device 110 may be further adapted as the corresponding functions of the electronic device 110 described in relation to FIG. 1.

Figure 5:
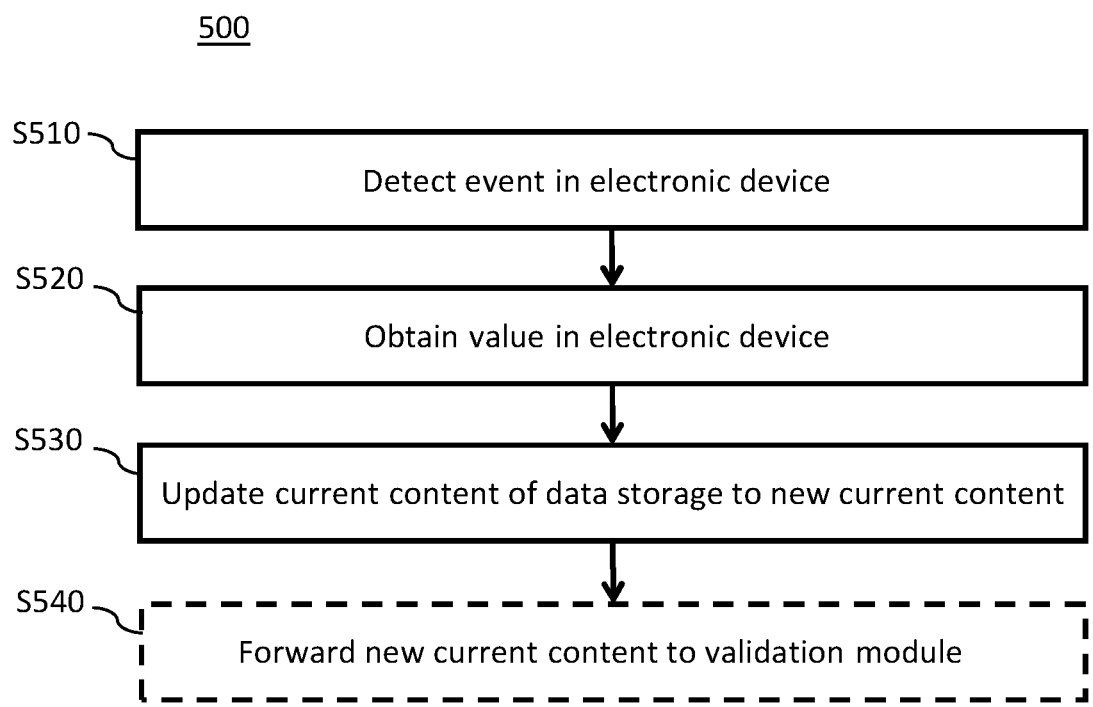
FIG. 5 is a flow chart of embodiments of a method for enabling notifying when security sensitive functionality of an electronic device has been previously enabled.

FIG. 5 is a flow chart of embodiments of a method 500 for enabling notifying when security sensitive functionality of an electronic device 110 has been previously enabled. The event indicating enabling of security sensitive functionality of the electronic device 110 may for example be setting of a root password, setting of an administrator password. Further events indicating enabling of security sensitive functionality are encompassed, such as enabling debug software functionality, enabling hardware debug functionality such as JTAG-access, Scan Chain, boundary scan or other DFT logic etc, accessing onboarding tokens to cloud services etc. Upon detecting S210 the event indicating enabling of security sensitive functionality of the electronic device 110, the electronic device 110 obtains S520 a value previously unknown to the electronic device 110, updates S530 the current content of the data storage 114 to a new current content of the data storage 114, and forwards S540 the new current content of the data storage 114 to a validation module 150. The current content of the data storage 114 is updated S530 to the new current content of the data storage 114 according to an updating function based on the current content of the data storage 114 and the value. The updating is required in the electronic device 110 upon detecting S510 the event. Hence, if an event indicating enabling of security sensitive functionality of the electronic device 110 is detected S510, the updating will always take place. Furthermore, without privileged access, the current content of the data storage 114 can only be updated using the updating function. Hence, no other updating of the data storage 114 is possible without privileged access and the content of the data storage 114 cannot be tampered with by an unauthorized user. Privileged access may for example be authenticated by means of a private key of the electronic device 110.

Updating S530 the current content of the data storage 114 to the new current content of the data storage 114 according to the updating function based on the current content of the data storage 114 and the value may comprise concatenating the value and the current content of the data storage 114, hashing, by means of a known hashing function, the concatenation of the value and the current content of the data storage 114. The current content of the data storage 114 is then updated such that the hashed concatenation of the value and the current content of the data storage 114 is the new current content of the data storage 114. Alternative ways of updating S530 the current content of the data storage 114 to the new current content of the data storage 114 are of course possible.

The method 500 may further comprise checking in the electronic device 110 that the new current content of the data storage 114 differs from the current content of the data storage 114 before update to ensure that updating was successful. If the known original content of the data storage 114 was that the data storage 114 was empty, the check may consist of checking that the data storage 114 is not empty after update to ensure that updating was successful.

The method 500 may further comprise forwarding S540 the new current content of the data storage 114 to a validation module 150. The forwarding of the new current content of the data storage 114 to the validation module 150 may be preceded by a request from a management module 130. Furthermore, the value obtained in the electronic device 110 may be a value, such as a random nonce, determined in the management module 130. By determining the value in the management module 130, the determined value can be controlled in the management module 130 and hence, it can be ensured in the management module 130 that the value is not previously known in the electronic device 110.

The forwarding S540 of the new current content of the data storage 114 to the validation module 150 may further include signing the new current content with a private key of the electronic device 110 by a TPM of the electronic device 110. The validation module 150 may then have previously received the public key corresponding to the private key of the electronic device 110, wherein the public key is authenticated by means of a certificate issued by a Certificate Authority (CA). Hence, the validation module 150 may validate that the new current content of the data storage 114 is in fact received from the electronic device 110 by means of the private key of the electronic device 110 used for signing.

The value which is previously unknown to the electronic device 110 may also be used to validate that the readout of the new current content of the data storage 114 received in the validation module 150 is in fact a readout of the data storage 114 made in response to the currently detected S510 event indicating enabling of security sensitive functionality of the electronic device 110. This may be done by adding the obtained value in the electronic device 110 to the new current content of the data storage 114 and having a TPM of the electronic device 110 signing the new current content of the data storage 114 plus the obtained value with the private key of the electronic device 110 and forward it to the management module 130. The obtained value previously unknown to the electronic device 110, e.g., in form of a nonce determined in the management module 130 and forwarded to the electronic device 110, may be further forwarded from the management module 130 to the validation module 150. The validation module 150 may then check by comparing the obtained value received from the management module 130 with the obtained value in the signed new current content of the data storage 114 plus the obtained value as received from the electronic device 110.

The steps of the method 500 may be further adapted as the corresponding steps of the method 200 described in relation to FIG. 2.

A person skilled in the art realizes that the present disclosure is not limited to the embodiments described above. On the contrary, many modifications and variations are possible within the scope of the appended claims. Such modifications and variations can be understood and effected by a skilled person in practicing the claimed disclosure, from a study of the drawings, the disclosure, and the appended claims.

The invention claimed is:

1. A method for enabling notifying when security sensitive functionality of an electronic device has been previously enabled, wherein the electronic device comprises a data storage having a current content, the method comprising:
in the electronic device:
detecting an event indicating enabling of security sensitive functionality of the electronic device;
upon detecting the event indicating enabling of security sensitive functionality of the electronic device:
obtaining a value previously unknown to the electronic device;
updating the current content of the data storage to a new current content of the data storage according to an updating function based on the current content of the data storage and the value, wherein, without privileged access, the current content of the data storage can only be updated using the updating function, and wherein the updating function is irreversible and collision resistant; and
forwarding the new current content of the data storage to a validation module; and
in a management module:
obtaining the value;
determining an expected new current content of the data storage according to the updating function based on a known original content of the data storage and the value; and
forwarding the expected new current content of the data storage to the validation module;
in the validation module:
comparing the new current content of the data storage with the expected new current content of the data storage; and
upon determining that the new current content of the data storage differs from the expected new current content of the data storage, generating a security notification.

2. The method of claim 1, wherein, in the electronic device, updating the current content of the data storage to a new current content of the data storage comprises: concatenating the value and the current content of the data storage; hashing, by means of a known hashing function, the concatenation of the value and the current content of the data storage; and updating the current content of the data storage such that the hashed concatenation of the value and the current content of the data storage is the new current content of the data storage.

3. The method according to claim 2, wherein, in the management module, determining an expected new current content of the data storage comprises:
on condition that the known original content of the data storage is that the data storage was originally empty:
hashing, by means of the known hashing function, the value; and
determining the expected new current content of the data storage to be the hashed value;
otherwise:
obtaining the known original content of the data storage;
hashing, by means of the known hashing function, a concatenation of the value and the known original content of the data storage; and
determining the expected new current content of the data storage to be the hashed concatenation of the value and the known original content of the data storage.

4. The method according to claim 1, wherein, in the management module, obtaining the value comprises determining the value, and further comprising, in the management module, forwarding the value to the electronic device, and
wherein, in the electronic device, obtaining the value comprises receiving the value from the management module.

5. The method according to claim 1, wherein the event indicating enabling of security sensitive functionality of the electronic device consists of one of setting of a root password and setting of an administrator password.

6. An electronic device comprising:
a data storage having a current content; and
device circuitry configured to execute:
a detection function configured to detect an event indicating enabling of security sensitive functionality of the electronic device;
a device value obtaining function configured to, upon detection of the event indicating enabling of security sensitive functionality of the electronic device, obtain a value previously unknown to the electronic device; and
an updating function configured to, upon detection of the event indicating enabling of security sensitive functionality of the electronic device, update the current content of the data storage to a new current content of the data storage according to an updating function based on the current content of the data storage and the value, wherein, without privileged access, the current content of the data storage can only be updated using the updating function and wherein the updating function is irreversible and collision resistant; the device further configured to communicate with a management module and a validation module, wherein the device circuitry is further configured to execute:
a device forwarding function configured to forward the new current content of the data storage to the validation module,
wherein the management module comprises:
management module circuitry configured to execute:
a management module value obtaining function configured to obtain the value;
an expected new current content determining function configured to determine an expected new current content of the data storage according to the updating function based on a known original content of the data storage and the value; and
a management module forwarding function configured to forward the expected new current content of the data storage to the validation module,
and wherein the validation module comprises:
validation module circuitry configured to execute:
a comparing function configured to compare the new current content of the data storage with the expected new current content of the data storage; and
a notification generating function configured to,
upon determining that the new current content of the data storage differs from the expected new current content of the data storage, generate a security notification.

7. A system for notifying when security sensitive functionality of an electronic device has been previously enabled comprising:
an electronic device comprising:
a data storage having a current content; and
device circuitry configured to execute:

a detection function configured to detect an event indicating enabling of security sensitive functionality of the electronic device;

a device value obtaining function configured to, upon detection of the event indicating enabling of security sensitive functionality of the electronic device, obtain a value previously unknown to the electronic device; and an updating function configured to, upon detection of the event indicating enabling of security sensitive functionality of the electronic device, update the current content of the data storage to a new current content of the data storage according to an updating function based on the current content of the data storage and the value, wherein, without privileged access, the current content of the data storage can only be updated using the updating function and wherein the updating function is irreversible and collision resistant;

a management module; and a validation module, wherein the device circuitry is further configured to execute:

a device forwarding function configured to forward the new current content of the data storage to the validation module, wherein the management module comprises:

management module circuitry configured to execute:

a management module value obtaining function configured to obtain the value;

an expected new current content determining function configured to determine an expected new current content of the data storage according to the updating function based on a known original content of the data storage and the value; and a management module forwarding function configured to forward the expected new current content of the data storage to the validation module, and wherein the validation module comprises:

validation module circuitry configured to execute:

a comparing function configured to compare the new current content of the data storage with the expected new current content of the data storage; and a notification generating function configured to, upon determining that the new current content of the data storage differs from the expected new current content of the data storage, generate a security notification.

8. The system according to claim 7, wherein the updating function is further configured to:

concatenate the value and the current content of the data storage;

hash, by means of a known hashing function, the concatenation of the value and the current content of the data storage; and update the data storage such that the hashed concatenation of the value and the current content of the data storage is the new current content of the data storage.

9. The system according to claim 8, wherein the known original content of the data storage is that the data storage was originally empty, wherein the expected new current content determining function is configured to:

hash, by means of the known hashing function, the value; and determine the expected new current content of the data storage to be the hashed value.

10. The system according to claim 8, wherein the management module circuitry is further configured to execute:

a known original content obtaining function configured to obtain a known original content of the data storage;

and wherein the expected new current content determining function is configured to:

hash, by means of the known hashing function, a concatenation of the value and the known original content of the data storage; and determine the expected new current content of the data storage to be the hashed concatenation of the value and the known original content of the data storage.

11. The system according to claim 7, wherein the management module value obtaining function is configured to determine the value, wherein the management module circuitry is further configured to execute a value forwarding function configured to forward the value to the electronic device, and wherein the device value obtaining function is configured to receive the value from the management module.

12. The system according to claim 7, wherein the event indicating enabling of security sensitive functionality of the electronic device consists of one of setting of a root password and setting of an administrator password.

13. A non-transitory computer readable storage medium having stored thereon instructions for implementing a method for enabling notifying when security sensitive functionality of an electronic device has been previously enabled, wherein the electronic device comprises a data storage having a current content, the method comprising:

in the electronic device:

detecting an event indicating enabling of security sensitive functionality of the electronic device;

upon detecting the event indicating enabling of security sensitive functionality of the electronic device:

obtaining a value previously unknown to the electronic device;

updating the current content of the data storage to a new current content of the data storage according to an updating function based on the current content of the data storage and the value, wherein, without privileged access, the current content of the data storage can only be updated using the updating function, and wherein the updating function is irreversible and collision resistant; and forwarding the new current content of the data storage to a validation module; and in a management module:

obtaining the value;

determining an expected new current content of the data storage according to the updating function based on a known original content of the data storage and the value; and forwarding the expected new current content of the data storage to the validation module;

in the validation module:

comparing the new current content of the data storage with the expected new current content of the data storage; and upon determining that the new current content of the data storage differs from the expected new current content of the data storage, generating a security notification.

* * * * *